(12) United States Patent
Verhee

(10) Patent No.: US 9,333,885 B2
(45) Date of Patent: May 10, 2016

(54) FOLDING VEHICLE SEAT

(71) Applicant: Ford Global Technologies, LLC, Dearborn, MI (US)

(72) Inventor: Patrick Verhee, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/224,562

(22) Filed: Mar. 25, 2014

(65) Prior Publication Data

US 2015/0274041 A1 Oct. 1, 2015

Related U.S. Application Data

(60) Provisional application No. 61/869,880, filed on Aug. 26, 2013.

(51) Int. Cl.
*B60N 2/30* (2006.01)
*B60N 3/10* (2006.01)
*B60N 2/36* (2006.01)

(52) U.S. Cl.
CPC .............. *B60N 2/309* (2013.01); *B60N 2/3031* (2013.01); *B60N 2/3065* (2013.01); *B60N 2/3093* (2013.01); *B60N 2/36* (2013.01); *B60N 3/101* (2013.01)

(58) Field of Classification Search
CPC ...... B60N 2/36; B60N 2/3029; B60N 2/3034; B60N 2/32; B60N 2/3061; B60N 2/3013; B60N 2/309; B60N 3/101; B60N 2/3031; B60N 2/3065; B60N 2/3093

USPC .................. 297/15, 341, 378.1, 334, 340; 296/65.09, 65.16, 65.05

See application file for complete search history.

(56) References Cited

U.S. PATENT DOCUMENTS

| | | | | |
|---|---|---|---|---|
| 3,191,958 A | * | 6/1965 | Smith | B62B 9/14 280/47.38 |
| 4,805,952 A | * | 2/1989 | Coleman | B60N 2/01541 248/503.1 |
| 5,588,707 A | * | 12/1996 | Bolsworth et al. | 297/378.12 |
| 6,270,141 B2 | * | 8/2001 | Moon et al. | 296/65.17 |
| 7,014,263 B2 | * | 3/2006 | Mukoujima et al. | 297/341 |

(Continued)

FOREIGN PATENT DOCUMENTS

| | | | |
|---|---|---|---|
| CA | 02479117 A1 | * | 9/2003 |
| DE | 19607060 D1 | | 4/1997 |

(Continued)

OTHER PUBLICATIONS

Hearst Communications, Inc., Car and Driver, 2011 Honda Odyssey EX-L interior photo, 2013, 3 pages.
Hyundai Motor Company, Australia PTY Limited, Interior Features photos, 2013, 3 pages.
New Car Test Drive, Inc., 2013 Dodge Journey, 1994-2013, 4 pages.

*Primary Examiner* — Milton Nelson, Jr.
(74) *Attorney, Agent, or Firm* — Vichit Chea; Price Heneveld LLP

(57) ABSTRACT

A vehicle seat assembly includes a seat member, a back member, and a base having a track and a guide with horizontal and vertical portions. The seat member is connected to the base by scissors linkage engaging the track to provide vertical and rearward translation of the seat member between use and stowed positions. The back member has a lower portion engaging the guide and providing horizontal and vertical translation of the lower portion of the back member, and rotation of the back member between upright and stowed positions.

18 Claims, 5 Drawing Sheets

(56) References Cited

U.S. PATENT DOCUMENTS

| | | |
|---|---|---|
| 7,036,884 B2 | 5/2006 | Becker et al. |
| 7,523,888 B2 * | 4/2009 | Ferry et al. ............... 244/118.6 |
| 2008/0164740 A1 * | 7/2008 | Harper et al. ............... 297/331 |
| 2009/0001795 A1 * | 1/2009 | Homier et al. ............... 297/341 |
| 2010/0052391 A1 * | 3/2010 | Hurst et al. ............... 297/341 |
| 2011/0284713 A1 * | 11/2011 | Ellerich ............... 248/421 |

FOREIGN PATENT DOCUMENTS

| | | |
|---|---|---|
| DE | 102011018894 A1 | 10/2012 |
| EP | 0738624 A1 | 4/1999 |
| FR | 2908700 A1 | 5/2008 |
| GB | 2278775 A | 12/1994 |
| WO | 2009015759 A1 | 12/2009 |
| WO | 2012083167 A1 | 6/2012 |

* cited by examiner

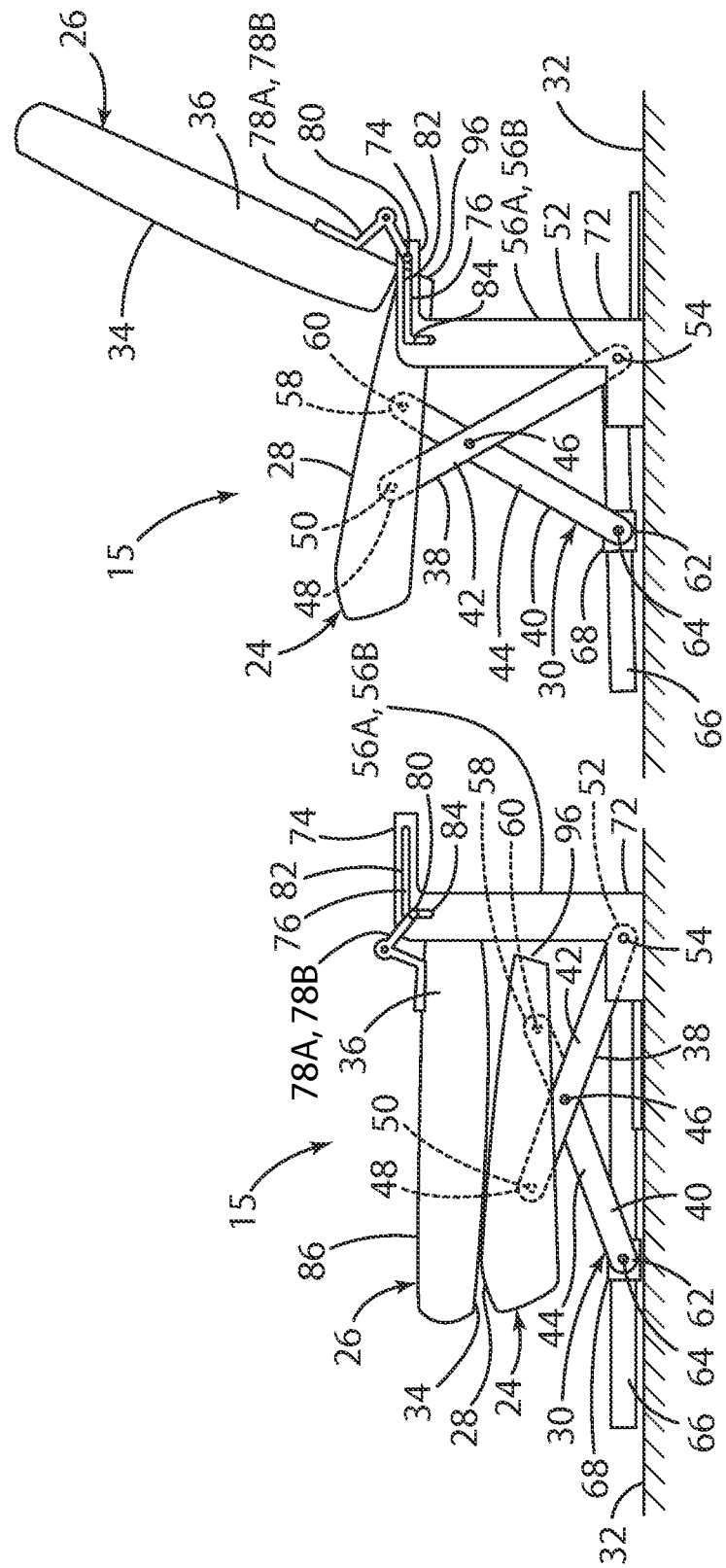

FOLDING VEHICLE SEAT

CROSS-REFERENCE TO RELATED APPLICATION

This application claims priority to and the benefit under 35 U.S.C. §119(e) of U.S. Provisional Patent Application No. 61/869,880, filed on Aug. 26, 2013, entitled "CENTER SECOND ROW FOLDING VEHICLE SEAT," the entire disclosure of which is hereby incorporated herein by reference.

FIELD OF THE INVENTION

The present invention generally relates to motor vehicles, and more particularly, to a vehicle seat that shifts between a compact stowed position and a use position.

BACKGROUND OF THE INVENTION

Various types of folding vehicle seats have been developed. Such seats may be utilized in a second row of seats in a motor vehicle. However, known folding or stowable seat designs may suffer from various drawbacks.

SUMMARY OF THE INVENTION

One aspect of the present invention is a stowable or folding vehicle seat including a base structure and a linkage including first and second links. The vehicle seat also includes a seat defining a seating surface, wherein the seat is movably connected to the base structure by the linkage for movement between a use position wherein the seating surface faces upwardly, and a stowed position. The first link has a first portion that is pivotably connected to the base structure, and a second portion that is pivotably connected to the seat. The second link has a first portion that is slidably and pivotably connected to the base structure, and a second portion that is pivotably connected to the seat. The first and second links may include central portions that are pivotably interconnected with one another to form a scissors linkage. The first and second links provide upward and rearward movement of the seat relative to the base structure as the seat moves from the stowed position to the use position. The vehicle seat further includes a back defining a back support surface. The back has a lower portion that is movably connected to the base structure by a connector whereby the back moves between a generally upright use position wherein the back support surface faces forwardly, in a generally horizontal stowed position. The connector provides pivoting of the back relative to the base structure, and also provides horizontal and vertical movement of the lower portion of the back relative to the base structure such that during movement from the upright position to the stowed position the back rotates downwardly and forwardly, and the lower portion moves forwardly and then downwardly.

Another aspect of the present invention is a vehicle seat including a base having a track and a guide with horizontal and vertical portions. A seat is connected to the base by scissors linkage engaging the track to provide vertical and rearward translation of the seat between use and stowed positions. The vehicle seat further includes a back having a lower portion engaging the guide and providing horizontal and vertical translation of the lower portion of the back, and rotation of the back between upright and stowed positions.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a side elevational view of the folding or stowable seat in a stowed position; and FIG. 6 is a side elevational view of the folding or stowable seat in a use position.

DETAILED DESCRIPTION OF THE PREFERRED EMBODIMENTS

Figure 1:
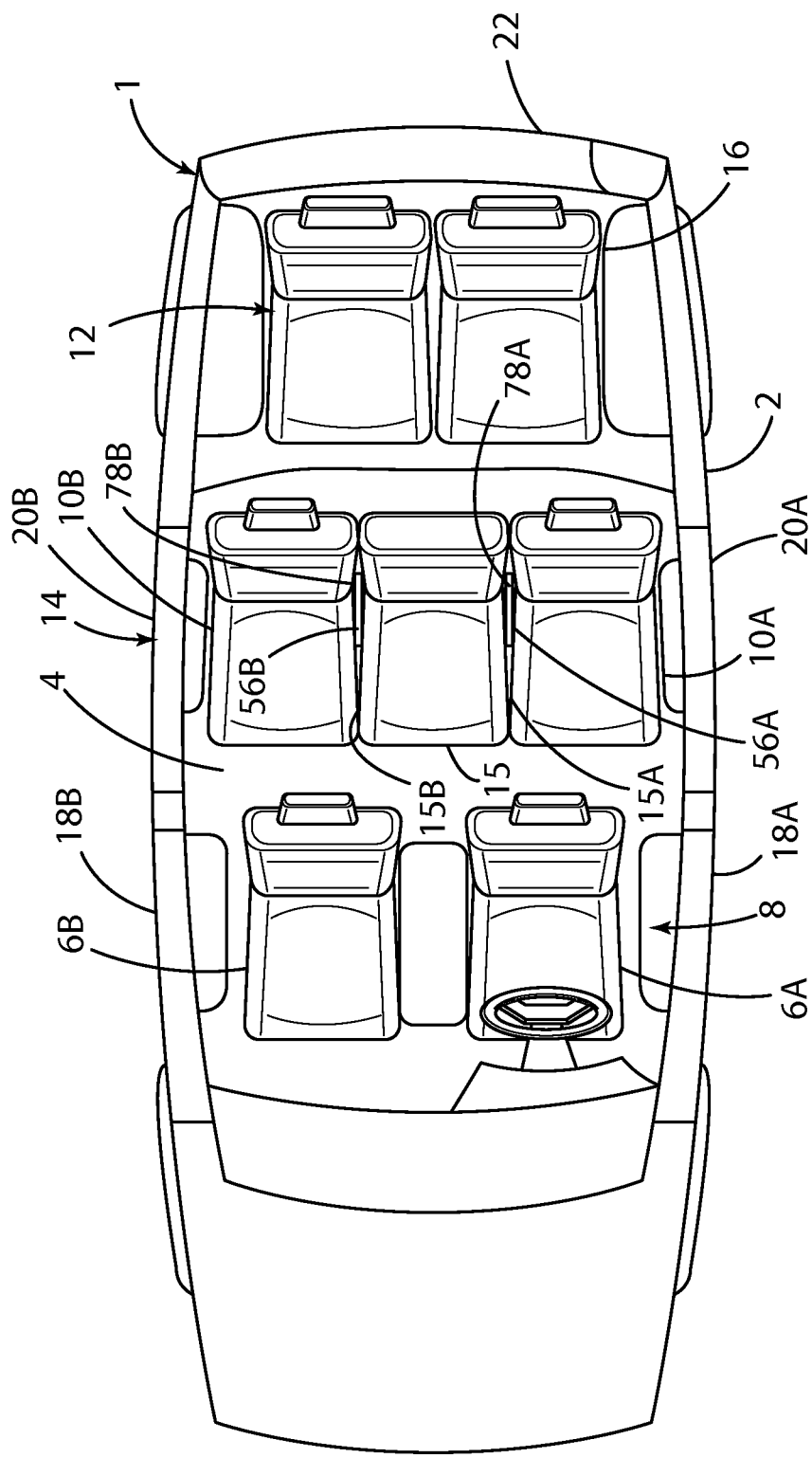
FIG. 1 is a top plan view of a motor vehicle according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a vehicle 1 according to one aspect of the present invention includes a vehicle structure 2 forming a vehicle interior 4 having front seats 6A and 6B defining a front row 8 of seats. The vehicle also includes a second row of seats 14 including rear seats 10A and 10B, and an assembly 15 that is foldable or stowable to provide access to a third row of seats 12 disposed in a rear interior space 16 of vehicle 1. The stowable seat assembly 15 may be positioned between seats 10A and 10B, or in virtually any other position as may be required for a particular application. The vehicle may include front doors 18A, 18B, and rear doors 20A, 20B, and a rear hatch 22. It will be understood that the third row of seats is optional. The third row of seats 12 may include three individual seats, or it may include two seats that are positioned directly adjacent one another as shown in FIG. 1. Alternatively, the third row of seats may comprise a bench seat configured to seat two or three people.

Figure 2:
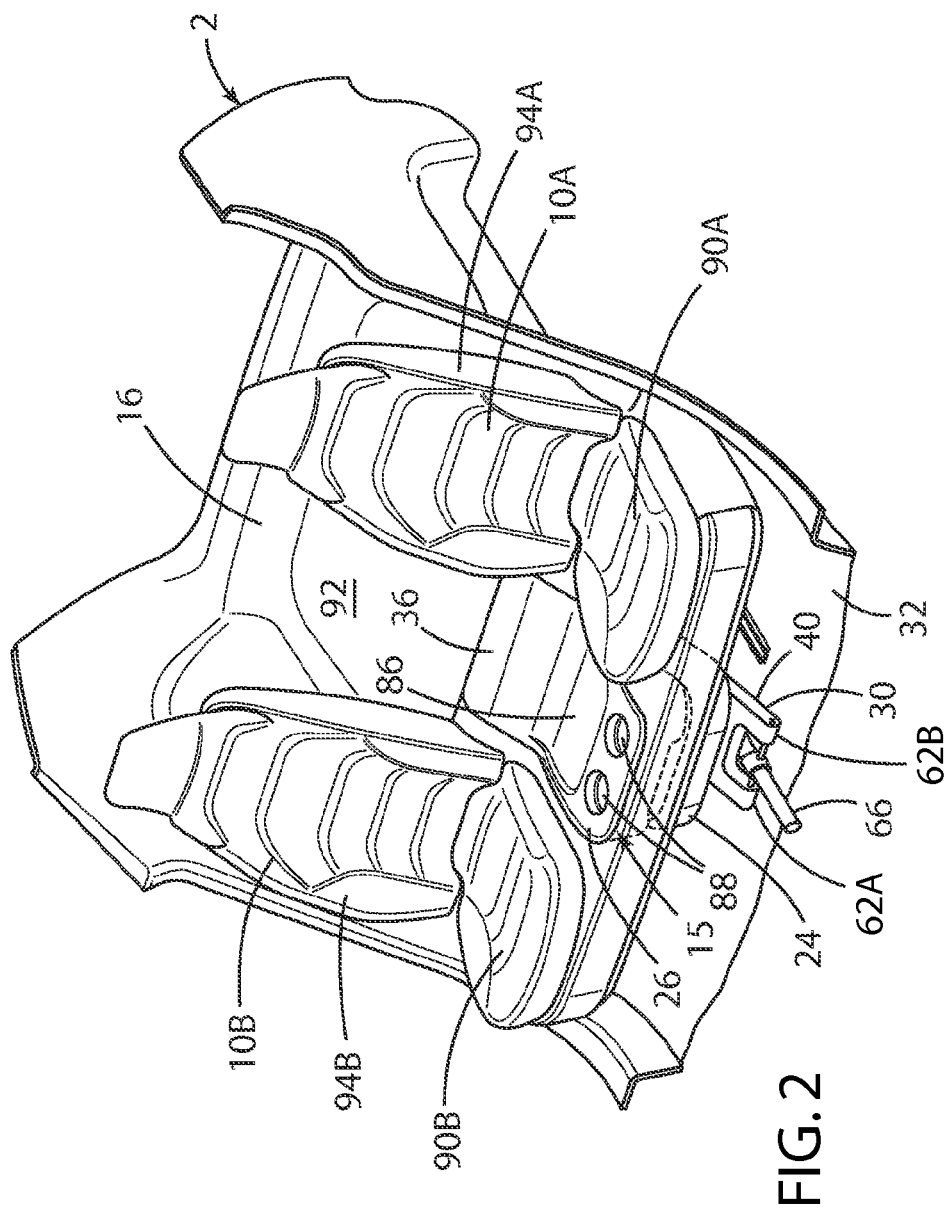
FIG. 2 is a partially fragmentary isometric view of a second row of seats of a motor vehicle showing a center seat in a folded position.
Figure 3:
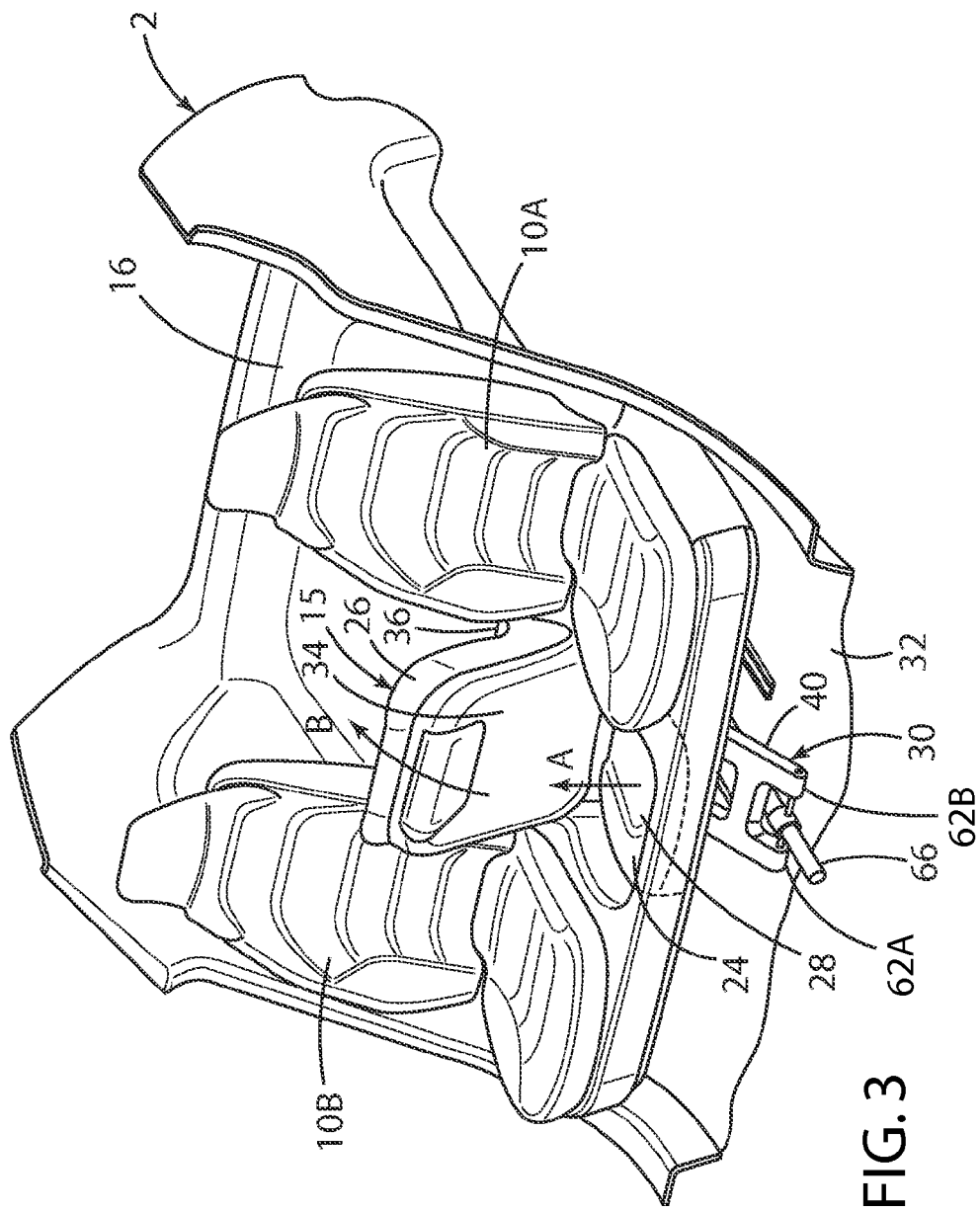
FIG. 3 is a partially fragmentary isometric view of a second row of seats of a motor vehicle showing the center seat moving from a stowed position to a use position.
Figure 4:
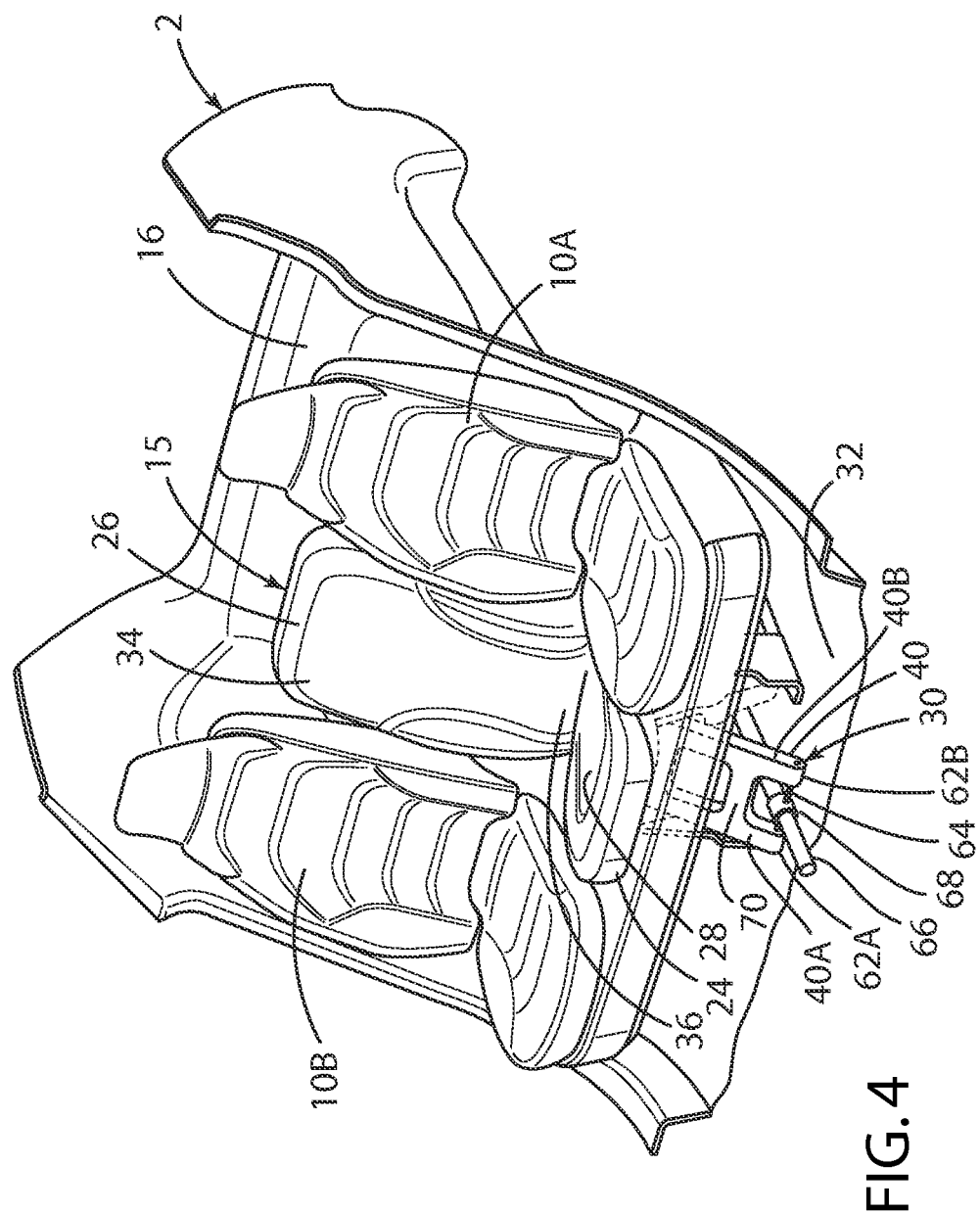
FIG. 4 is a partially fragmentary isometric view of a second row of seats of a motor vehicle showing a center seat in a use position.

With further reference to FIGS. 2-4, the seat 15 may be shifted from a stowed or folded configuration (FIG. 2) to a use position (FIG. 4). Seat assembly 15 includes a seat 24 and a back 26. The seat 24 includes a seating surface 28 that generally faces upwardly when the seat 24 is in a stowed position (FIG. 2), an intermediate position (FIG. 3), and a use position (FIG. 4). As discussed in more detail below, the seat 24 is movably interconnected to a base or floor structure 32 by a linkage 30 that causes seat 24 to translate upwardly and rearwardly as it moves from the stowed position (FIG. 2) to the use position (FIG. 4). As also discussed in more detail below, the back 26 is movably interconnected to a base or floor structure 32 such that the back 26 rotates as it moves from the stowed position (FIG. 2) to the upright use position (FIG. 4). A lower portion 36 of the seat back 26 translates upwardly and then rearwardly as the seat back 26 moves from the stowed position (FIG. 2) to the use position (FIG. 4). The back 26 includes a back support surface 34 that generally faces downwardly when the back 26 is in a stowed configuration (FIG. 2), and faces forwardly when the seat back 26 is in an upright use position (FIG. 4).

With further reference to FIGS. 5 and 6, linkage 30 comprises a scissors linkage having first and second links 38 and 40 having intermediate portions 42 and 44, respectively, that are pivotably interconnected at a pivot 46. Upper end 48 of first link 38 is pivotably connected to seat 24 at pivot 50, and lower end 52 is pivotably connected to brackets 56A, 56B of base structure 32 at a pivot 54.

Upper end 58 of second link 40 is pivotably connected to seat 24 at an upper pivot 60, and a lower end 62 of second link 40 is pivotably and slidably connected to a track 66 of base or floor structure 32 at a lower pivot 64. Lower end 62 of second link 40 may be pivotably connected to a slide member 68, and the slide member 68 slidably engages the track 66. The track 66 may comprise an elongated guide structure that extends in a fore-aft direction such that the lower end 62 of second link 40 translates in a fore-aft direction as the seat 24 moves between the stowed position (FIG. 5) and the upper, use position (FIG. 6).

Referring again to FIGS. 2-4, first link 40 may comprise a H-shaped portion with elongated side portions 40A and 40B having lower ends 62A and 62B, respectively that are pivotably and slidably interconnected with track member 66 by a pivot pin 64 and slide member 68. It will be understood that the linkage 30 and track 66 may have a variety of configurations as required for a particular application.

Referring again to FIGS. 5 and 6, the bracket portions 56A, 56B include lower portions 72 that are configured to be secured to a vehicle floor 32, and upper ends 74 including slots 76. Referring to FIG. 1, the bracket portions 56A, 56B are disposed on opposite sides 15A and 15B of the seat 24 and back 26. The bracket portions 56A, 56B are identical to one another or mirror images of one another. The bracket portions 56A, 56B may comprise separate structures that are secured to floor structure 32, or they may comprise parts of a single base structure that is secured to (or part of) floor structure 32. A pair of connector brackets 78A, 78B are connected to lower portion 36 of back 26. Each bracket 78A, 78B includes a lower end 80 that slidably and pivotably engages the slots 76. The slots 76 include a horizontal portion 82 and a vertical portion 84. When the back 26 is in a stowed position (FIG. 5), the end or pin 80 of brackets 78A, 78B are disposed in vertical portions 84 of slots 76. As the back 26 is moved to the upright or use position (FIG. 6), the pin or end 80 first travels upwardly in vertical portions 84 of slots 76, and then translates rearwardly along the horizontal portions 82 of slots 76. The back 26 also pivots about the ends or pins 80 of connector brackets 78A, 78B as the back 26 moves from the stowed position (FIG. 5) to the upright or use position (FIG. 6).

As shown in FIG. 5, when the seat 24 and back 26 are in the stowed position, the seat 24 is in a lowered position directly adjacent the floor 32 with the seating surface 28 facing upwardly. When the back 26 is in the stowed position (FIG. 5), the back support surface 34 generally faces downwardly, and the back support surface 34 may contact the seating surface 28 to thereby support the back 26 in the stowed position. The rear surface 86 of back 26 faces upwardly when the back is in the stowed position of FIG. 5. Referring again to FIG. 2, the rear surface 86 of back 26 is relatively low when the back 26 is in a stowed configuration. Specifically, the rear surface 86 may be at about the same height as the adjacent seating surfaces 90A and 90B of rear seats 10A and 10B, respectively. Alternatively, the rear surface 86 may be somewhat lower or somewhat higher than the seating surfaces 90A and 90B. The rear surface 86 of back 26 may include openings 88 forming cup holders for use by occupants of the seats 10A and 10B when seat assembly 15 is stowed. When the seat assembly 15 is in the stowed configuration as shown in FIG. 2, users can readily access the rear space 16 through the space 92 between the backs 94A and 94B of seats 10A and 10B, respectively. As discussed above, vehicle 1 may optionally include a third row of seats 12 as shown in FIG. 1. The third row of seats 12 (if present) may be readily accessed through the space 92 between backs 94A and 94B of seats 10A and 10B.

Referring again to FIGS. 5 and 6, as the seat 24 moves from the stowed position (FIG. 5) to the use position (FIG. 6), the seat 24 translates upwardly and rearwardly due to the linkage 30. This causes the rear edge 96 of seat 24 to shift from a position in front of the bracket portions 56 as shown in FIG. 5, to a position wherein the rear edge 96 of seat 24 is positioned rearwardly of the bracket portions 56 as shown in FIG. 6.

As the seat back 26 shifts from the stowed position of FIG. 5 to the upright use position of FIG. 6, the lower end or pins 80 of brackets 78 move upwardly along vertical portions 84 of slots 76, and then translate rearwardly along the horizontal portions 82 of slots 76. The back 26 also pivots about the lower end or pins 80 of brackets 78, such that the back 26 rotates as it shifts from the stowed position of FIG. 5 to the upright position of FIG. 6.

The stowable or folding seat assembly 15 of the present invention stows or folds to a very compact position to permit access to a rear space or third row of seats of a motor vehicle. When the seat assembly 15 is an upright or use position/configuration, the seat 15 is generally positioned at the same height as the adjacent rear seats 10A and 10B to provide comfortable seating.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A stowable vehicle seat, comprising:
   a base structure;
   a linkage including first and second links;
   a seat defining a seating surface, wherein the seat is movably connected to the base structure by the linkage for movement between a use position wherein the seating surface faces upwardly and a stowed position;
   wherein the first link has a first portion that is pivotably connected to the base structure, and a second portion that is pivotably connected to the seat;
   wherein the second link has a first portion that is slidably and pivotably connected to the base structure, and a second portion that is pivotably connected to the seat, and wherein the first and second links provide upward and rearward movement of the seat relative to the base structure as the seat moves from the stowed position to the use position;
   a back defining a back support surface, the back having a lower portion that is movably connected to the base structure by a connector whereby the back moves between a generally upright use position and a generally horizontal stowed position, wherein the connector comprises a guide structure on the base structure, and an engagement member on the back that movably engages the guide structure and moves along a path defined by the guide structure, the connector providing pivoting of the back relative to the base structure, and horizontal and vertical movement of the lower portion of the back relative to the base structure such that, during movement from the upright position to the stowed position, the back rotates downwardly and forwardly and the lower portion moves forwardly and then downwardly.

2. The stowable vehicle seat of claim 1, wherein:
the path includes a generally horizontal portion and a generally vertical portion such that the engagement member moves forwardly along the horizontal portion then downwardly along the vertical portion as the back is moved from the upright position to the stowed position.

3. The stowable vehicle seat of claim 2, wherein:
the guide structure comprises an elongated guide slot in the base structure.

4. The stowable vehicle seat of claim 3, wherein:
the engagement member comprises a pin member that is movably received in the guide slot.

5. The stowable vehicle seat of claim 3, wherein:
the guide slot includes a substantially linear horizontal portion and a substantially linear vertical portion.

6. The stowable vehicle seat of claim 5, wherein:
the base structure includes first and second side portions disposed on opposite sides of the lower portion of the seat back, and wherein each elongated slot includes a first elongated slot disposed in the first side portion and a second elongated slot disposed in the second side portion; and
the lower portion of the seat back includes first and second pin members that extend outwardly in opposite directions, and wherein each of the first and second pin members are movably received in the first elongated guide slot and the second don sated guide slot, respectively.

7. The stowable vehicle seat of claim 6, wherein:
the first and second side portions of the base structure comprise upright plate portions.

8. The stowable vehicle seat of claim 7, wherein:
the first and second side portions of the base structure include upright support portions having upper portions connected to the upright plate portions, and lower portions that are configured to be rigidly connected to a floor structure of a vehicle.

9. The stowable vehicle seat of claim 1, wherein:
the first link defines an intermediate portion and first and second ends, and wherein the first end is pivotably connected to the base structure and the second end is pivotably connected to the base structure;
the second link defines an intermediate portion and first and second ends, and wherein the first end is slidably and pivotably connected to the base structure such that the first end translates in a fore-aft direction relative to the base structure, and wherein the second end of the second link is pivotably connected to the seat; and
the intermediate portions of the first and second links are pivotably interconnected.

10. The stowable vehicle seat of claim 9, wherein:
the seating surface faces upwardly when the seat is in the stowed and use positions.

11. The stowable vehicle seat of claim 10, wherein:
the base structure includes a substantially linear track extending in a fore-aft direction, and the second end of the second link movably engages the linear track such that the second end of the second link moves along a substantially linear fore-aft path.

12. The stowable vehicle seat of claim 11, wherein:
the second end of the second link includes a pair of horizontally spaced apart engagement features that movably engage the linear track at horizontally spaced apart locations.

13. A vehicle seat comprising:
a base having a track and a guide with horizontal and vertical positions, wherein the guide is generally defined by a slot in the base, the slot being generally L-shaped and including a vertical front portion having an upper end and a horizontal portion having a forward end that intersects the upper end;
a seat connected to the base by a scissors linkage engaging the track to provide vertical and rearward translation of the seat between use and stowed positions; and
a back having a lower portion engaging the guide and providing horizontal and vertical translation of the lower portion and rotation of the back between upright and stowed positions.

14. The vehicle of seat of claim 13, wherein:
the base includes a pair of upright supports having upper ends disposed on opposite sides of the lower portion of the back, and wherein each upper end includes the slot; and
the lower portion of the back including a pair of connectors rotatably and slidably engaging each slot to provide horizontal and vertical movement of the lower portion of the back.

15. The vehicle seat of claim 13, wherein:
the scissors linkage includes a first link that is pivotably connected to the seat and the base, and a second link having a first portion that engages the track for fore-aft movement and a second portion that is pivotably connected to the seat.

16. The vehicle seat of claim 13, wherein:
the seat includes a seating surface that faces upwardly when the seat is in the use and stowed positions.

17. The vehicle seat of claim 16, wherein:
the back includes a back support surface that faces forwardly when the back is in its upright position, and faces downwardly when the back is in its stowed position.

18. A vehicle seat comprising:
a base having a track;
an L-shaped slot defined in the base and having vertical and horizontal portions;
a seat connected to the track by a scissors linkage to provide vertical and rearward translation of the seat between use and stowed positions; and
a back having a pin engaging the slot and providing horizontal and vertical translation of the back and rotation of the back between upright and stowed positions.

* * * * *